United States Patent [19]
Jeng et al.

[11] Patent Number: 6,011,870
[45] Date of Patent: Jan. 4, 2000

[54] MULTIPLE STAGE AND LOW-COMPLEXITY MOTION ESTIMATION FOR INTERFRAME VIDEO CODING

[76] Inventors: Fure-Ching Jeng, 1575 Tenaka Pl., #0-1, Sunnyvale, Calif. 94087; Cheng-Tie Chen, 6936 Serenity Way; Ting-Chung Chen, 7039 Burnside Dr., both of San Jose, Calif. 95120

[21] Appl. No.: 08/896,618

[22] Filed: Jul. 18, 1997

[51] Int. Cl.$^7$ .................... G06K 9/36; H04N 7/12
[52] U.S. Cl. ............... 382/236; 348/416; 348/402
[58] Field of Search ......................... 382/236, 107; 348/416, 420, 402, 407, 699

[56] References Cited

U.S. PATENT DOCUMENTS

| | | | |
|---|---|---|---|
| 5,212,742 | 5/1993 | Normille et al. | 382/56 |
| 5,267,334 | 11/1993 | Normille et al. | 382/56 |
| 5,293,229 | 3/1994 | Iu | 348/415 |
| 5,398,068 | 3/1995 | Liu et al. | 348/416 |
| 5,486,863 | 1/1996 | Auyeung et al. | 348/420 |
| 5,598,514 | 1/1997 | Purcell et al. | 395/118 |
| 5,612,735 | 3/1997 | Haskell et al. | 348/43 |
| 5,619,256 | 4/1997 | Haskell et al. | 348/43 |
| 5,630,033 | 5/1997 | Purcell et al. | 395/118 |
| 5,734,419 | 3/1998 | Botsford, III et al. | 348/97 |
| 5,793,429 | 8/1998 | Kim et al. | 348/416 |

OTHER PUBLICATIONS

ISO/IEC 13818–2 (1995).
ISO/IEC 11172–2 (1993).

*Primary Examiner*—Andrew W. Johns
*Attorney, Agent, or Firm*—Fernandez & Associates, LLP

[57] ABSTRACT

A digital signal processor encodes video signals per MPEG standard to achieve multi-stage, low-complexity motion estimation for interframe video coding. A dual-stage motion prediction module processes a compressed bitstream through pixel-averaging, and then applies a Sum-Of-Absolute-Difference (SOAD) function to the bitstream. A minimum motion vector signal is thereby generated over a search range initially for rough determination, then to provide a more refined estimation, the SOAD function is re-applied to the surrounding 16×16 blocks, preferably by full and half-pel vertical and horizontal offsets.

26 Claims, 12 Drawing Sheets

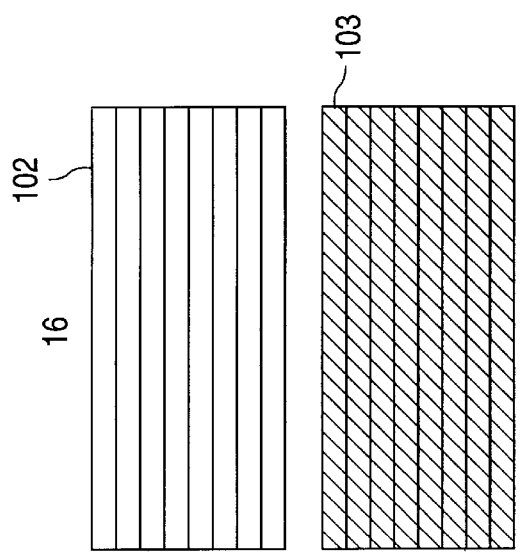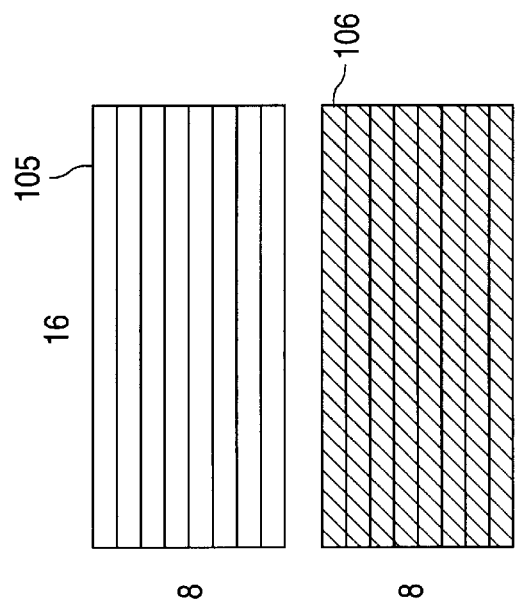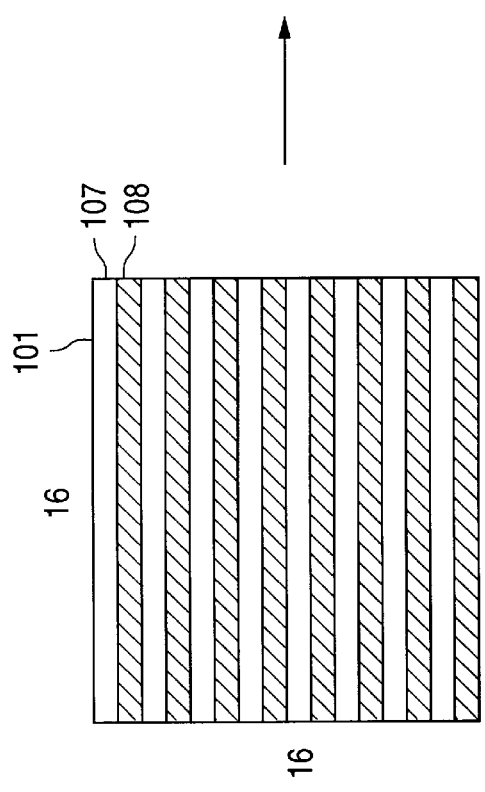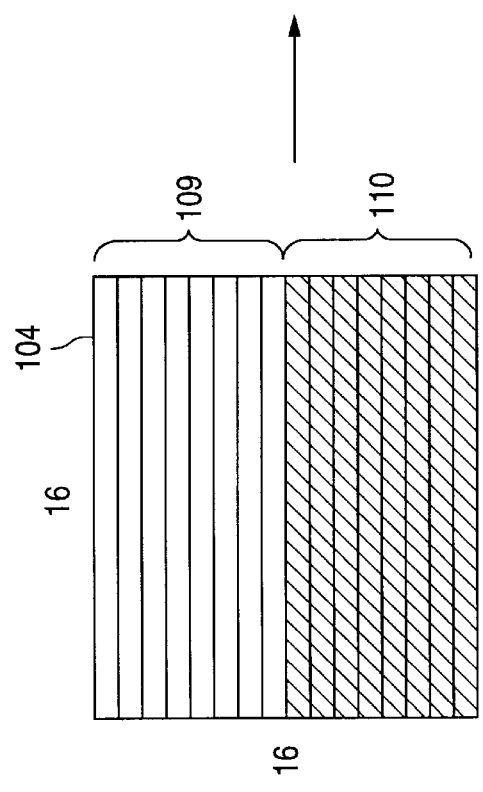
FIG. 7A
FIG. 7B

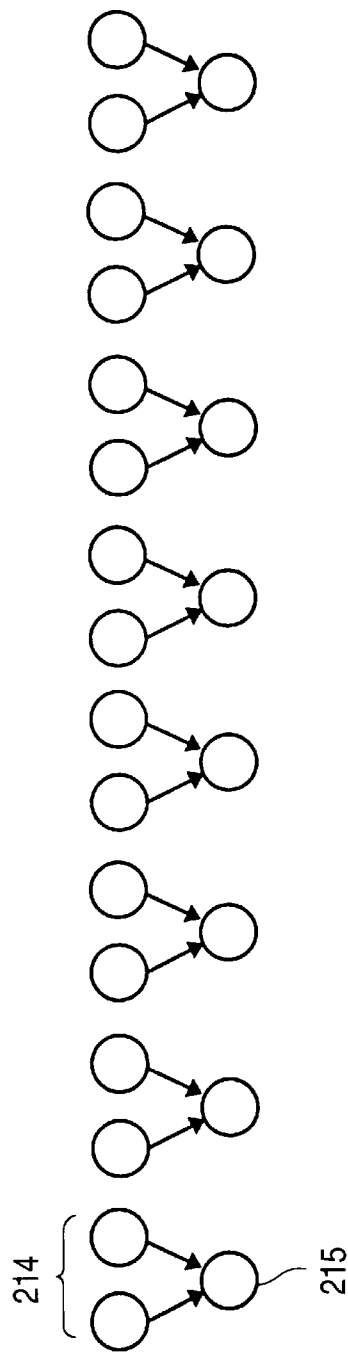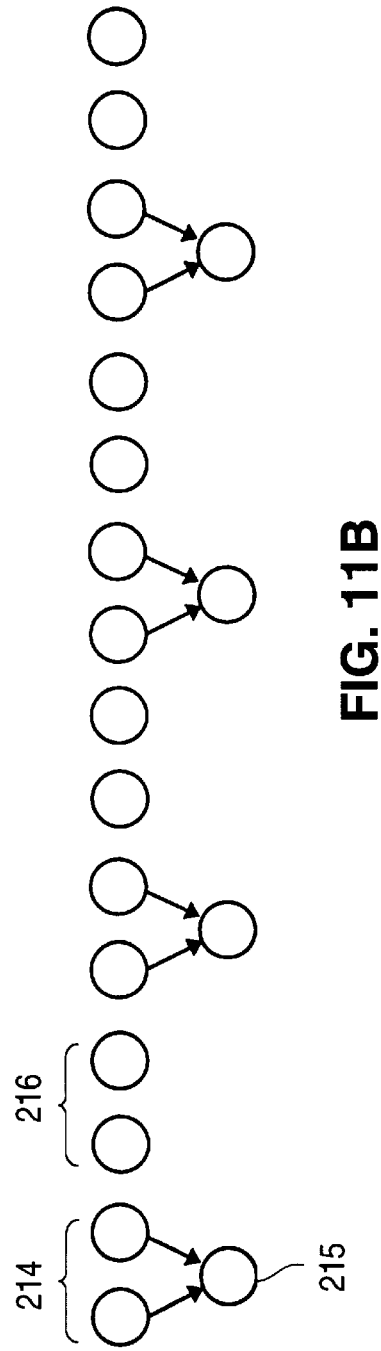
FIG. 11A
FIG. 11B

MULTIPLE STAGE AND LOW-COMPLEXITY MOTION ESTIMATION FOR INTERFRAME VIDEO CODING

BACKGROUND OF THE INVENTION

1. Field of the Invention

The invention relates to electronic signal processing of digital video information, particularly to encoding of compressed video signals according to MPEG format.

2. Description of Background Art

MPEG ("Motion Picture Experts Group") refers to standard for encoding and decoding moving pictures and associated audio (MPEG I and II) as adopted by International Standardization Organization (Geneva) and specified in ISO/IEC 13818-2, Recommendation ITU-T. H.262 (1995E) as well as in related ISO/IEC 11172-2 (1993), which is referred to therein such publications being hereby incorporated by reference.

Previous video information was formatted, transmitted and stored largely in analog form. Recent implementation of video equipment, media and signaling, however, have shifted increasingly from analog to more desirable digitized paradigm. Digital video offers, not just improved functionality and quality, but substantially lower cost for program producers and consumers as emerging digital video standards, namely MPEG, facilitate delivery of advanced low-cost video applications to mainstream markets. Additionally, compelling technical and economic benefits arise when digital video systems and components are implemented in integrated circuits using conventional manufacturing processes, such as Complementary Metal Oxide Semiconductor (CMOS).

In context of MPEG (I and II) specification, various complex processing algorithms are defined for digitally encoding and decoding compressed video bitstream, such as motion-compensated predictive coding, discrete cosine transform, and variable length coding. Particularly, with respect to motion compensation during encoding process, wherein, among other things, two-dimensional motion vectors are used for predicting or estimating video picture data, namely frame or field information, by providing offsets into past and/or future reference frames or fields, predictions are formed, as specified, from previously decoded pictures which are combined, for example, with certain coefficient data to recover final decoded samples.

Although MPEG contemplates such motion-compensated coding scheme, the standard does not specify necessarily a particular way in which motion estimation is to be achieved, so long as correct syntax for motion vectors is followed. Hence, various approaches at estimating motion have been set forth. Haskell, et al. describe motion-compensated prediction for MPEG encoding using estimate averaging or weighted choices (U.S. Pat. No. 5,619,256), or using disparity estimates based on forward and backward predictions (U.S. Pat. No. 5,612,735). Iu describes in U.S. Pat. No. 5,293,229 MPEG encoding prediction using group-of-fields, distributed intra (I) and predictive (P) fields, and reduced I and P fields. Furthermore, Normille, et al. describe removing frame redundancy based on detected scene changes in sequence of moving images (U.S. Pat. No. 5,267,334), and compressed video encoding (U.S. Pat. No. 5,212,742). Additionally, U.S. Pat. Nos. 5,630,033 and 5,598,514 to Purcell, et al. describe MPEG encoder including motion estimation.

Prior art approaches at motion estimation, particularly for MPEG encoding process, are not structured optimally for semiconductor circuit implementation as well as providing low complexity. Therefore, there is a need to provide efficient algorithm and system for generating predictive motion vectors, particularly optimized for implementation as high-performance digital signal processor in integrated circuits.

SUMMARY OF THE INVENTION

The invention resides in a digital signal processor for encoding compressed video signals compliant to MPEG standard preferably to achieve multistage, low-complexity motion estimation for interframe video coding as integrated in semiconductor implementation. Dual-stage motion prediction scheme pixel-averages compressed bitstream and applies Sum-Of-Absolute-Difference (SOAD) function to generate minimum motion vector signal over a selected search range for initial rough determination, then refines motion-estimation by reapplying SOAD function one or more times to surrounding 16×16 blocks by fill and half-pel vertical and horizontal offsets further to select minimum motion vector signal. Optionally, digital video signals as received or generated according to inventive methodology herein are respectively provided from or to CMOS imager and/or embedded DRAM circuits.

BRIEF DESCRIPTION OF THE DRAWINGS

FIGS. 7A and 7B are simplified diagrams showing respectively fame pictures and field pictures partitioned for motion estimation according to present invention.

FIGS. 11A and 11B are simplified diagrams showing respectively half and fourth sample in horizontal direction according to present invention.

DETAILED DESCRIPTION OF THE PREFERRED EMBODIMENT

Figure 1:
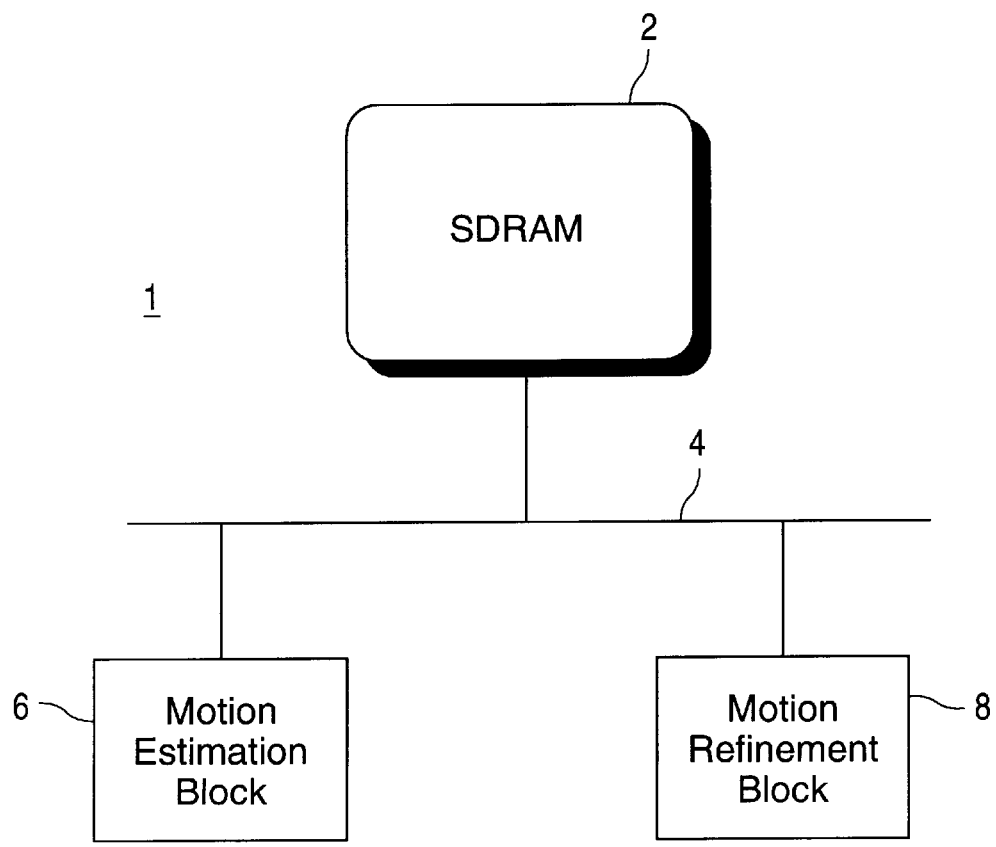
FIG. 1 is a block diagram of digital video compression subsystem 1 including memory 2, motion estimator 6, and motion refiner 8 for implementing the present invention.

FIG. 1 is a simplified block diagram of digital video processing system 1, including conventional digital storage or Synchronous Dynamic Random Access Memory (SDRAM) 2, estimator or Motion Estimation Block (MEB) 6, and refiner or Motion Refinement Block (MRB) 8. As defined further herein, blocks 6, 8 are digital signal or bitstream processing software and/or circuits for estimating or predicting video motion displacement, for example, by calculating forward and/or backward motion vector values of current 16×16 matrix block of pels or macroblock from search windows of reconstructed reference pictures.

Present inventive system 1 is designed to handle various video signal processing conditions and automatic detection thereof. Depending on timing of reference picture, motion estimation is forward or backward. Forward motion estimation is applied to P-type current macroblock, and both forward and backward estimations are applied to B-type macroblock. Moreover, depending on motion picture characteristic, search range vary, for example, [−7.5, 7.5], −[15.5, 15.5], [−31.5, 31.5], and [−63.5, 63.5] pels per frame. For P-type frame, search range supports up to [−63.5, 63.5] pels, and for B-type frame, search range supports up to [−31.5, 31.5] pels.

Generally, the signal processing system 1 handles both frame and field picture formats. For frame picture, frame and field estimations are performed. Such field estimation includes top-to-top, bottom-to-top, top-to-bottom, and bottom-to-bottom estimations. For field picture, system performs 16×16 and 16×8 estimations. In case of 16×8 estimation, upper-to-upper, lower-to-upper, upper-to-lower, and lower-to-lower estimations are included. Preferred system motion search range is implemented up to 63.5 pixels horizontally and 31.5 pixels vertically.

While present system 1 may perform frame and field estimations for frame picture, and 16×16 and 16×8 size block estimations for field picture, actually only frame estimation needs to be done for frame picture, and only 16×16 estimation needs to be done for field picture. This convenience arises since field estimation and 16×8 estimation are incidental calculation by-products of frame estimation and 16×16 estimation respectively. Hence, to a limited extent, system 1 may use common signal processing functionality to accomplish estimation steps simultaneously for frame and field pictures.

When functioning to implement the two-step motion estimation algorithm, initially incoming digital video bitstream signal is received for processing by system 1, and MEB 6 performs coarser motion vector calculation thereto and stores result in memory 2, then MRB 8 reads signals through data bus 4 such result and performs finer motion vector calculation thereto for improved prediction of motion image displacement, preferably to half or quarter pixel or pel image granularity to determine relative image movement. Such two-step scheme is implemented preferably as high-performance signal processing circuit integrated in single chip, achieving low latency effectively by completing both estimation stages within single macroblock slice time delay.

Figure 2:
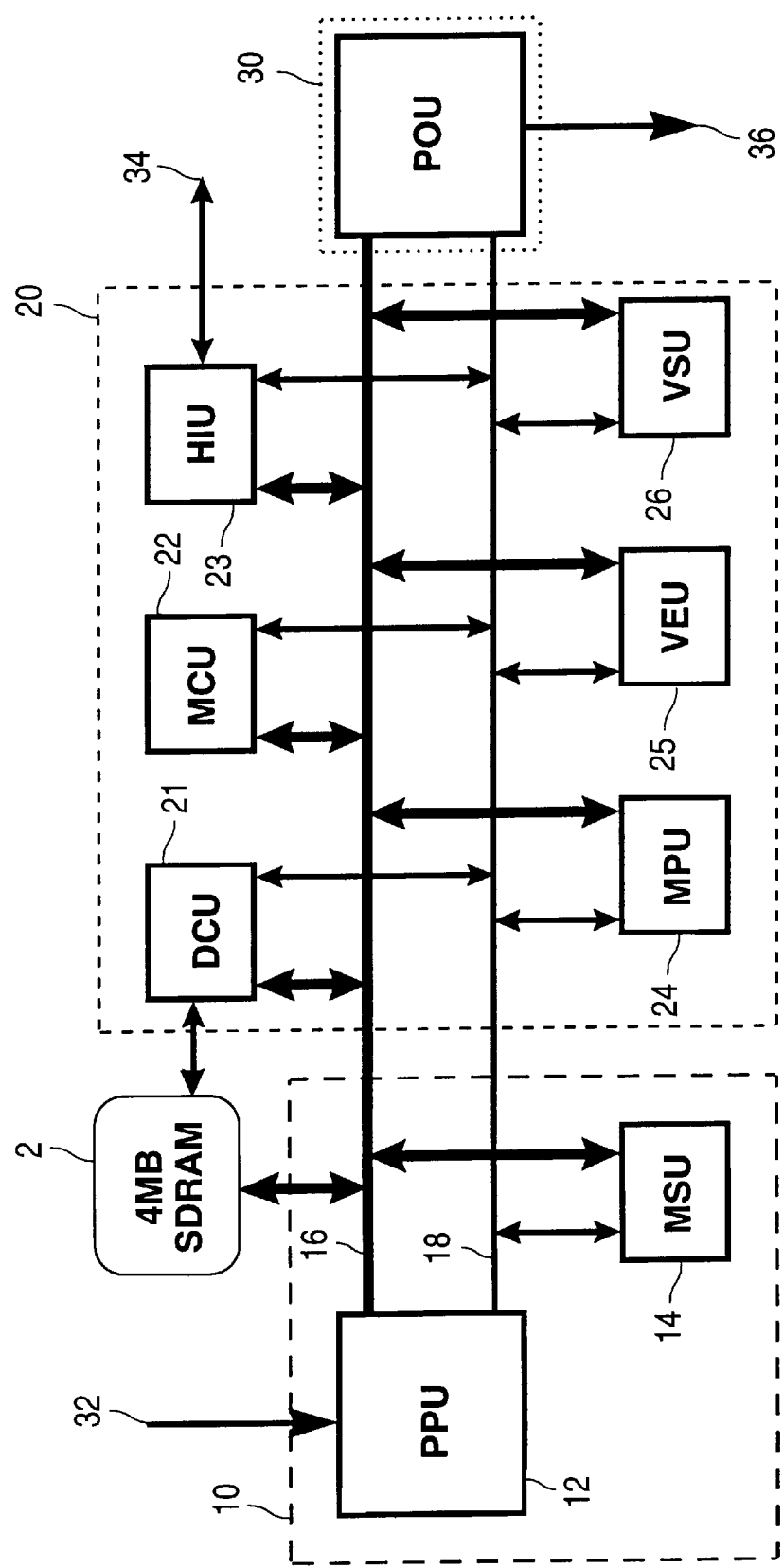
FIG. 2 is a block diagram of preferred chip architecture including encoding-only 10, encoding/decoding 20, and decoding-only 30 facilities for implementing present invention.

FIG. 2 is a block diagram of preferred single-hip architecture including encoding-only 10, encoding/decoding 20, and decoding-only 30 circuit data path sections or integrated modular subsystems provided to perform inventive signal processing methodology claimed herein. As shown, various functional blocks (in Encoding portion 10: Pre-Processing Unit (PPU) 12, and Motion Search Unit (MSU) 14; in combined Encoding and Decoding portion 20: DRAM Control Unit (DCU) 21, Micro-Controller Unit (MCU) 22, Host Interface Unit (HIU) 23, Motion Prediction Unit (MPU or MPD) 24, Video Engine Unit (VEU) 25, and Video Stream Unit (VSU) 26; in Decoding portion 30: Post-Processing Unit (POU)) couple in parallel to 64-bit data bus (dbus) 16 and 16-bit register bus (rbus) 18.

Dbus 16 serves as main channel for sending and receiving data and control signals among and between such functional modules 21, 22, 23, 24, 25, 26, 30, 12, 14 and 4–8 megabyte synchronous DRAM 2, which may be separate discrete storage device or embedded memory integrated on-chip with MEB 6 and/or MRB 8 functionality. Rbus 18 serves as main channel for sending and receiving data and control signals between MCU 22 and other such functional modules 21, 23, 24, 25, 26, 30, 12, 14. Double bus (dbus 16 and rbus 18) as presented provides improved system performance; however, single dbus 16 architecture, without rbus 18, would provide acceptable but significantly reduced overall signal processing throughput.

Initially, incoming digital video signal 32, preferably compliant with ITU-R 601 standard, for example, having luminance of 720 pels width and 480 pels height, is received by PPU 12 in encoding subsystem module 10, for example, from other on-chip encoding circuitry, embedded imaging or video detection device integrated on-chip, such as CMOS or charge coupled device (CCD) pixel array or other imaging circuit, or equivalently coupled discretely thereto as separate digital video signal detection or generation appliance. PPU 12 functions to preprocess signal 32 by converting video image format, effectively truncating picture boundaries, for example, into luminance having 704 pels width and 480 pels height. PPU 12 also serves to reduce 601 signal format from 4|2|2 format to 4|2|0 format. Also in encoding module 10, MSU 14 includes MEB 6 and MRB 8, which function according to the present invention as described herein.

In encoding/decoding portion 20, various functional modules 21, 22, 23, 24, 25, 26 are provided. DCU 21 couples to SDRAM 2 and functions to convert picture coordinate signal received to SDRAM 2 coordinates. This signal conversion enables data stored in memory 2 to be fetched properly therefrom. DCU 21 also serves effectively as arbitrator for dbus 16. Additionally, MCU 22 serves effectively as arbitrator for rbus 18. Neither DCU 21 nor MCU 22 are actually in main signal processing data flow, although such modules 21, 22 couple and interact directly therewith.

MCU 22 is preferably provided as general purpose or reduced instruction set (RISC) processor which essentially coordinates timing signals between functional modules 21, 22, 23, 24, 25, 26, 30, 12, 14, as well as performs various operational and maintenance tasks for such modules. For example, MCU 22 instructs one or more of such modules when to start functioning, or responds to certain service requests from one or more of such modules to perform signal processing or system tasks.

HIU 23 performs higher level and system interface functions, such as passing user parameters, microprocessor code to MCU 22, or compressed bitstream to outside host processor or system 34, such as digital video disk (DVD) appliance, CMOS imager, video camera or recorder, television (TV)/cable/satellite head-end or set-top device, two-way video conferencing or other multimedia communications, broadcast, surveillance or digital video storage equipment, etc. (not shown). Also, VSU 26 performs higher level and system interface functions, such as packaging digital video signal into proper bitstream protocol, including MPEG video stream headers.

MPU 24 performs motion prediction operation based on best-match motion vector signal received from MRB 8 in MSU 14. Accordingly, MPU 24 calculates therefrom motion prediction data, preferably as 16×16 pel matrix macroblock having 8 bits per pel, which is provided to VEU 25. Such prediction calculation may be performed iteratively to achieve single or half-pel accuse or effective image resolution in relive motion displacement, as well as forward and/or backward motion vector interpolation. MPEG non-compliant quarter, eight, sixteenth or other lesser pel accuracy can be supported as well.

As configured preferably herein, MPU 24 couples directly to MSU 14 and VEU 25, such that data and control signals are transmitted directly therebetween, without passing with more bus-access delays through rbus 18 or dbus 16. Hence, MSU 14 may send certain motion vectors directly from MRB 8 to MPU 24, and MPU 24 may send current macroblock pixel and prediction values directly to VEU 25. Note, during compressed video signal processing, limited macroblock processing latency may arise, nonetheless, between MRB 8 and WPU 24, as well as between MEB 6 and MRB 8, depending largely on particular picture size.

Decode-only POU 30 functions essentially as reverse of PPU 12 module, for example, to enlarge video picture format to ITU-R 601 standard luminance boundary dimensions, thereby providing desired video-out signal 36.

Figure 3:
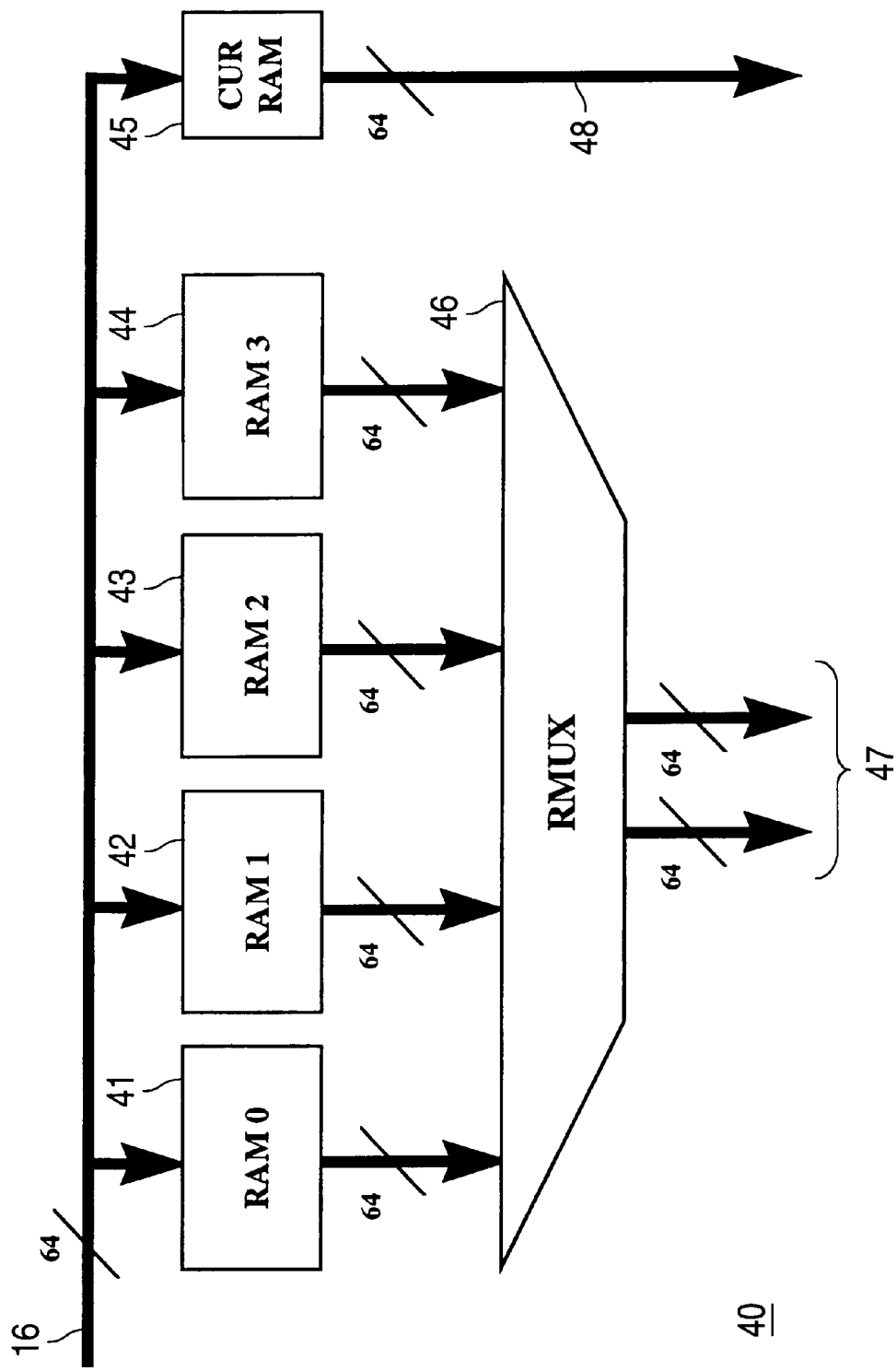
FIG. 3 is a block diagram of memory cache structure 40 provided in motion estimator 6.

FIG. 3 shows memory block diagram of cache RAM and multiplexer structure 40, which is provided in MEB 6 to receive bitstream from SDRAM 2 through dbus 16. Such incoming bitstream data including reference and current picture data are stored in four internal static RAM units 41, 42, 43, 44, which receive reference data preferably in interleave store and access convention within or between such RAM units, and single RAM 45, which receives current data preferably 16×16 pel macroblock format under evaluation.

RAM multiplexer (RMUX) 46 logically selects particular reference data or macroblock stored in cache RAM 41, 42, 43, 44 to generate reference signals 47, while current signal 48 is generated directly from RAM 45. Reference and current signals 47, 48 are each then provided over 64-bit bus to set of eight Sum Of Absolute Difference (SOAD) modules 51(1–8) in MEB 6, respectively as signals 57(1–8) and 58(1–8) for corresponding reference and current signals 47, 48.

Figure 4:
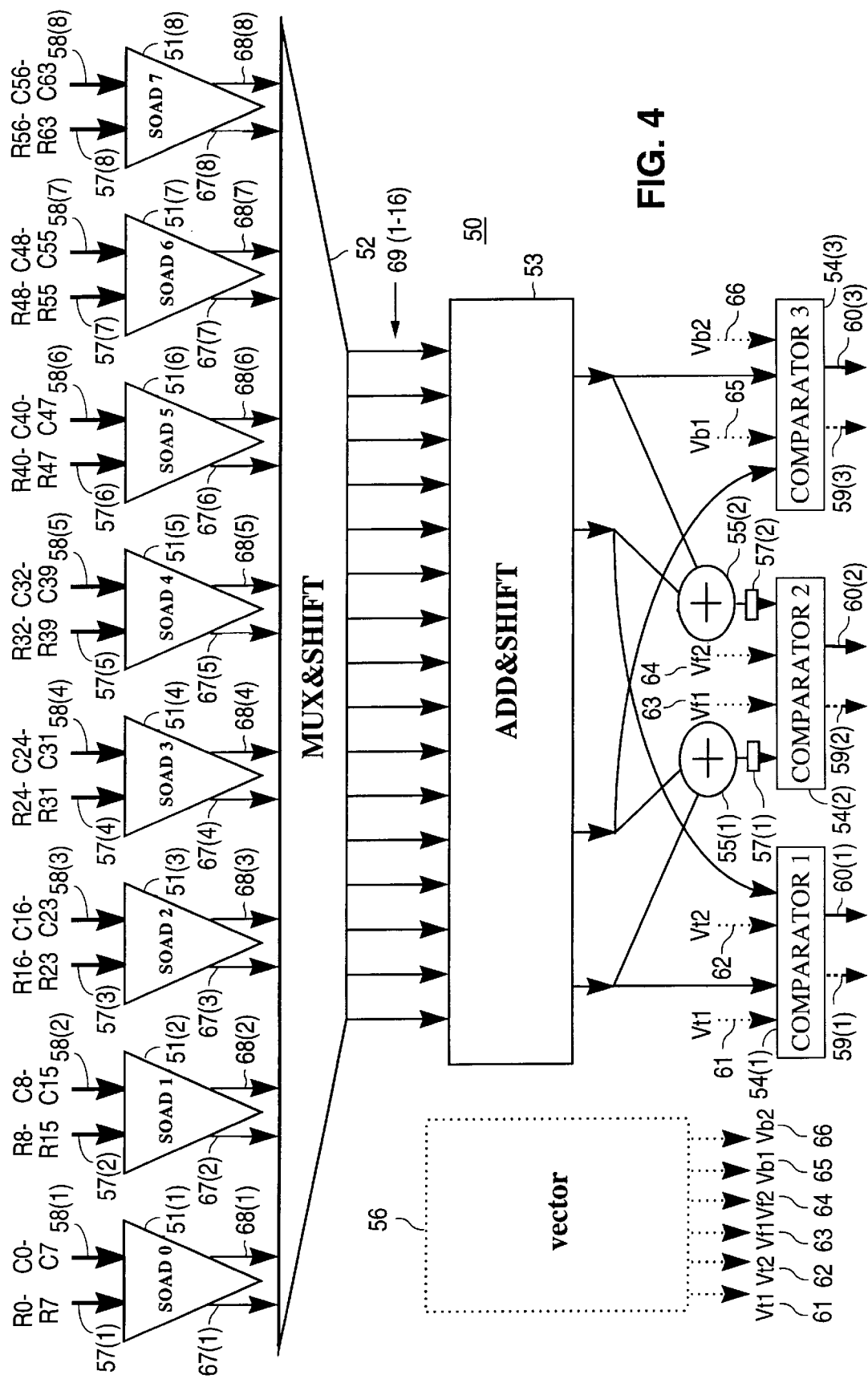
FIG. 4 is a block diagram of data path 50 provided in motion estimator 6.

FIG. 4 shows block diagram of data path 50 in MEB 6 for processing eight pixels at a time for first-stage coarse or rough video displacement or differential motion vector estimation or prediction. MEB 6 includes SOAD modules 51(1–8), multiplexer and shift module 52, add and shift module 53, summing modules 55(1–2), comparators 54(1–3), and by-pass vector calculation module 56.

As shown, SOAD modules 51(1–8) each receive reference signal 57(x), which is designated Ry to Ry+7 bits per signal, and similarly current signal 58(a), which is designated Cb to Cb+7 bits per signal. Moreover, each SOAD module 51(1–8) generates correspondingly SOAD output signal pair 67(1–8), 68(1–8).

Generalized Sum Of Absolute Difference (SOAD) formula and corresponding "best" motion vector formula, which minimizes SOAD function, are provided as follows:

$$SOAD(v_x, v_y) = \sum_x \sum_y |f(x, y) - g(x, y)| \quad (1)$$

$$\text{Best motion vector} = \min_{\{v_x, v_y\}} SOAD(v_x, v_y) \quad (2)$$

where:
{$v_x$, $v_y$} is the search range
f (x, y) is the current picture g (x, y) is the reference picture In certain cases, interpolated solutions are used to achieve better motion estimation. For instance, when in case of so-called B-picture image processing, where multiple reference data are generated, such as temporally-relative forward and backward reference pictures, it is desirable to solve for following variations, where h(x, y) is additional reference picture:

$$\min_{\{v_x, v_y\} Forward} SOAD(v_x, v_y) \sum_x \sum_y |f(x, y) - g(x, y)| \quad (3)$$

$$\min_{\{v_x, v_y\} Backward} SOAD(v_x, v_y) \sum_x \sum_y |f(x, y) - h(x, y)| \quad (4)$$

$$\min_{\{v_x, v_y\} Average} SOAD(v_x, v_y) \sum_x \sum_y |f(x, y) - 1/2(g(x, y) + h(x, y))| \quad (5)$$

Figure 5:
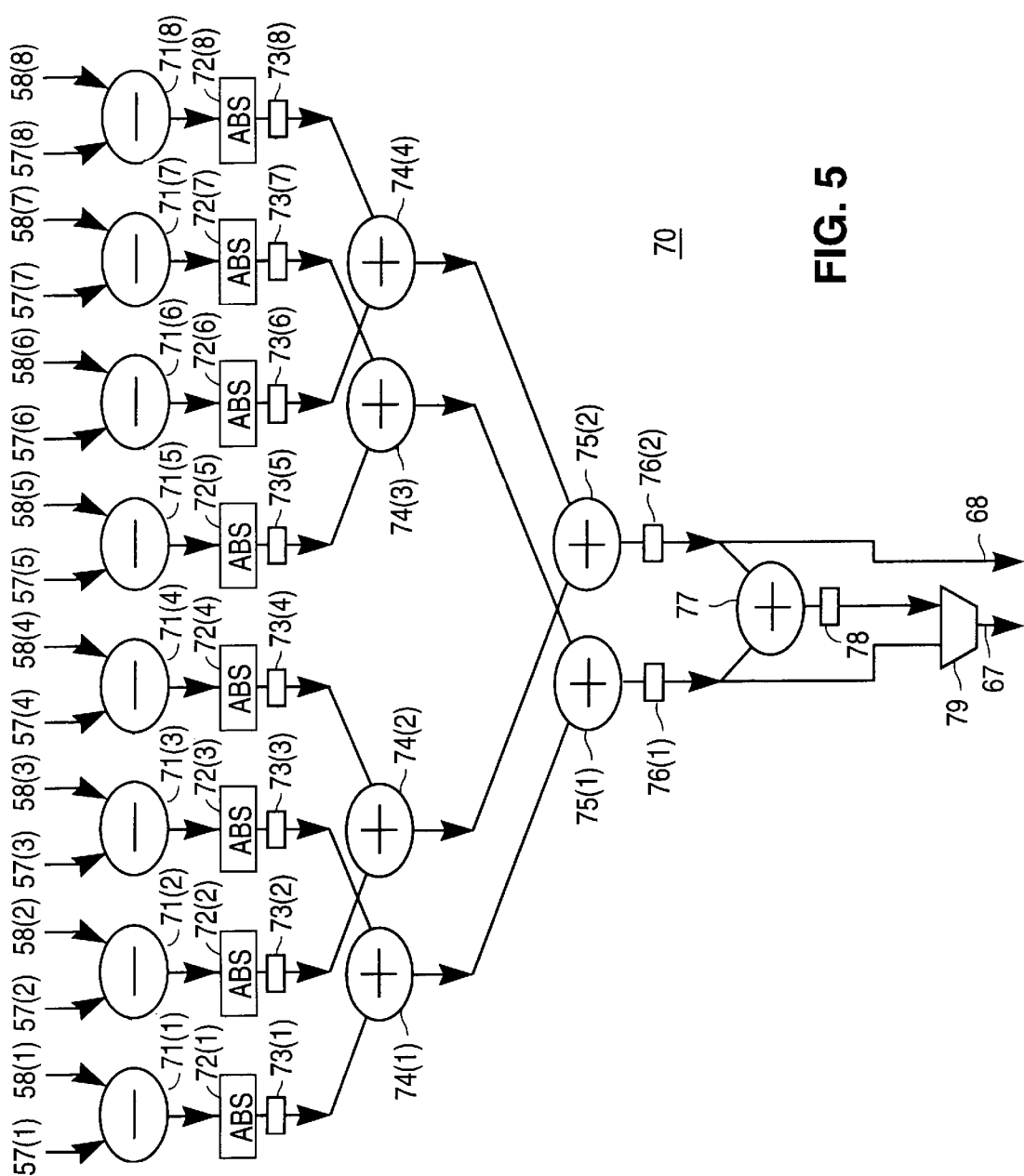
FIG. 5 is a block diagram of Sum Of Absolute Difference (SOAD) cell 70 provided in data path 50.

SOAD module 51 cell details are illustrated in logic schematic form in FIG. 5. Each SOAD unit 51(1–8) comprises data path which receives reference and current signal pairs 57(1–8), 58(8). Such signal pairs are applied to 8-bit subtraction by differential units 71(1–8), which each generate difference signal. Such difference signals are received by Absolute value (ABS) units 72(1–8), thereby generating eight separate 9-bit absolute value signals. Such eight ABS signals are then received in alternating pairs, as shown, by four summing units 74(1–4), which generate four summed signals.

Such four summed signals are then received in alternating pairs, as shown, by two summing units 75(1–2) coupled correspondingly to buffer or shift registers 76(1–2), which then respectively generate pair of buffered output signals, as shown. One such buffered signal is provided as SOAD output signal 68(y). Other SOAD output signal 67(x) is generated, as shown, by multiplexer 79 receiving buffered signal from buffer 76(1) and buffer or shift register 78, which then received signal from summing unit 77 that sums buffered signals from registers 76(1–2). Preferably, shift registers or buffers 57, 73, 76, 78 are included herein to accommodate cycle time variances between pixel signal processing, particularly during data path arithmetic calculations.

Referring to FIG. 4, SOAD output signals 67(1–8), 68(8) are received by multiplexer and shift module 52, which, in order to facilitate motion recognition, generate therefrom mux-shift signals 69(1–16), as then received directly by add and shift module 53, which, in order to assemble complete 16×16 macroblock from eight-pixel bitstream, generate therefrom four signals, as shown to be received by comparators 54(1–3) and summing modules 55(1–2) with corresponding cache or shift registers 57(1–2).

By-pass vector calculation module 56 takes advantage of already-calculated data signals from internal signal processing modules and paths, such as RMUX controller 46, to generate vector signals Vt1 61 and Vt2 62, which are received by comparator 54(1) to generate signal pair 59(1), 60(1) for processing top reference field data, vector signals Vf1 63 and Vf2 64, which are received by comparator 54(2) to generate signal pair 59(2), 60(2) for processing forward reference field data, as well as vector signals Vb1 65 and Vb2 66, which are received by comparator 54(1) to generate signal pair 59(1), 60 (1) for processing bottom reference field data.

Note that for each motion estimate performed by MEB 6, best-match motion vector which yields minimum SOAD calculation is stored in SDRAM 2 Further, each macroblock will have six best-match motion vectors in total. Additionally, for Field-type motion estimation, information for selecting which reference field (i.e., top or bottom field) for estimation is obtained through bypass redundancy in the process.

Figure 6:
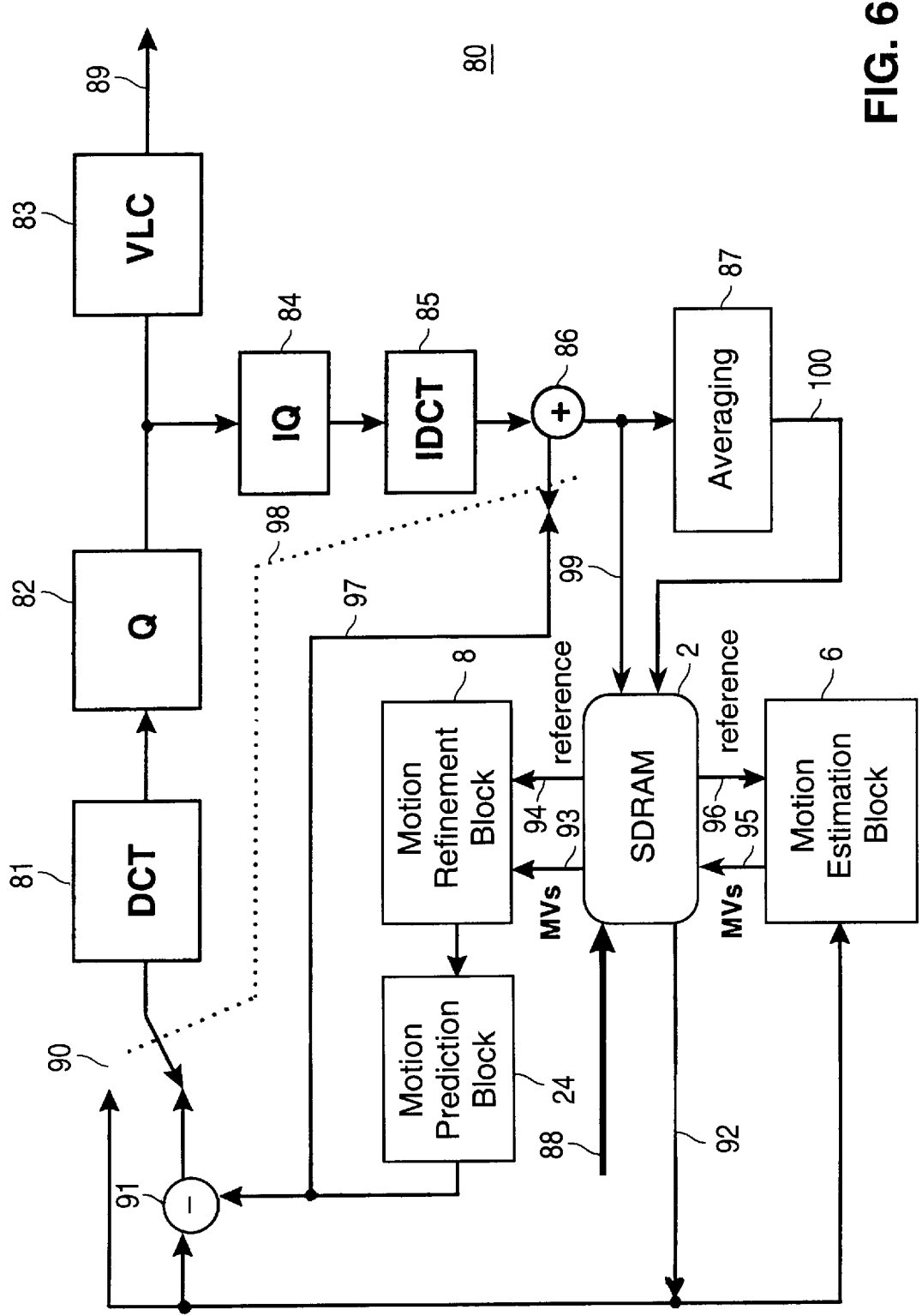
FIG. 6 is a block diagram of video compression system 80 showing data flow according to present invention.

FIG. 6 shows top-level block diagram of digital compressed video encoding and system 80 showing signal processing data flow, and particularly including two-stage (i.e., coarse and fine) motion estimation algorithm as implemented by MSU 14, which includes MRB 8 and MEB 6, and memory 2. Initially, digital video bitstream is pre-processed and input 88 by PPU 12 through dbus 16 to SDRAM 2 for signal processing generally according to the present invention. MEB 6 and MRB 8 receive respectively reference signals 96, 94. Such reference signals 96, 94 include values to facilitate staged motion estimation, such as search range portion of picture of current macroblock for searching against forward and/or backward picture data.

Current macroblock signal 92 is sent from SDRAM 2 to MEB 6 as well as to subtraction unit 91 and switch 90, and first-stage course motion estimation is performed, as specified herein, to generate motion vector signals 95 that are transferred to SDRAM 2. Then, second-stage refined motion estimation is performed, as specified herein, using reference and motion vector signals 94, 93 by MRB 8 to generate improved motion vector signals that are transferred to motion prediction block (MPD/MPU) 24.

Hence, block 24 effectively receives signal-processed result of 2-staged, best-match motion vectors 95, 93 as calculated respectively by MEB 6 and MRB 8 for hierarchical integrated signal processing and transmission eventually as predicted signal 97 to VEU 25 through summing unit 86 and subtraction unit 91 with switch 90 coupled thereto.

Logic switch 90 may cause digital switching between signal 92 from SDRAM 2 or subtraction signal from subtraction unit 91. Preferably, selectable switching criteria is determined dynamically or automatically when such signals arrive and are evaluated by MPU 24, particularly, according to predefined, weight historical, or adaptive statistical performance thresholds as whether:

(A) To conduct motion prediction scheme (i.e., use signal 97) when historical, current or predictive video signal motion vectors indicate or suggest likely change in bitstream motion content, or (B) To skip motion prediction scheme (i.e., use signal 92) and merely process current video bitsteam from storage, thereby not wasting additional system compute resources when historical, current or predictive video signal motion vectors do not indicate or suggest likely change in bitstream motion content.

As shown, VEU 25 is delineated 98 to include various digital signal processing modules 81, 82, 83, 84, 85, 86, 87. Discrete cosine transform (DCT) module 81 receives switched signal from switch 90 and generates DCT signal for transfer to quantization (Q) module 82. Preferably, DCT algorithm is optimized for circuit performance to reduce actual number of multiplications, e.g., by using less than 10-point DCT algorithm.

Q module 82 receives DCT signal and generates Q signal using conventional divide function, which is received by variable length coding (VLC) module 83 and inverse quantization (IQ) module 84. IQ module 84 generates IQ signal using conventional multiply function, which is received by inverse discrete cosine transform (IDCT) module 85, which preferably uses corresponding implementation for multiplication to optimize circuit performance, while conforming to IEEE Standard 1180.

VLC module 83 delivers encoded video signal 89, which is received by VSU 26 for high-level video header packaging, then further processed by HIU 23 for high-level processing for delivery to outside host processor. IDCT module 85 then generates IDCT signal which is summed by summing unit 86 using predicted signal 97. Summing unit 86 generates summed signal 99 which is received by SDRAM 2 and averaging module 87. Preferably, to improve system processing throughput, certain critical signals 97, 90, 92 are transferred directly to VEU 25, without going through dbus 16 arbitration delays.

Figure 12:
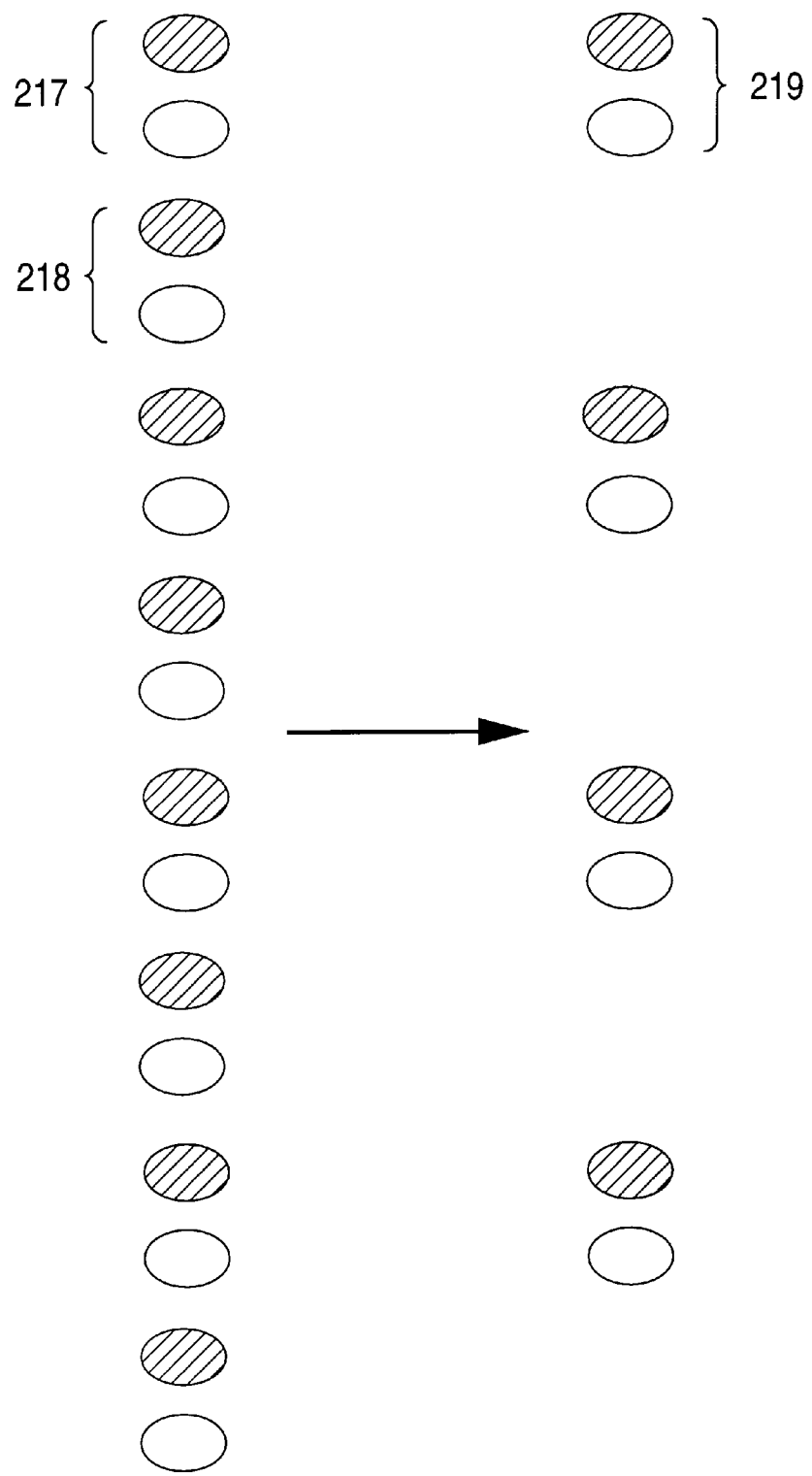
FIG. 12 is simplified diagram showing half sample in vertical direction according to present invention.

To improve signal processing performance, pixel averaging and/or omitting scheme is used, particularly to conserve DRAM bandwidth and traffic associated with calculating predictive vector values for complete video screen pel samples. Averaging module 87 optionally generates "pixel-averaged" signal 100 for SDRAM 2 in three cases, as illustrated in FIGS. 11A, 11B and 12. In particular, summed signal 99 may be processed by calculating signal 100 as follows:

(1) Referring to FIG. 11A, average values 215 for each sequential horizontally-neighboring pel pairs 214 of particular motion vector values associated with each such horizontally-neighboring pel pair. In this way, since every two pels are combined into one pel, total computations are effectively reduced by half.

(2) Referring to FIG. 11B, average values 215 for every other alternating horizontally-neighboring pel pairs 214 of particular motion vector values associated with such every other horizontally-neighboring pel pair, and effectively disregarding, to reduce computational activity, average values of those every other neighboring pel pairs 216 that are not calculated.

(3) Referring to FIG. 12, for each pel of every other vertically-neighboring pel pair 217 a motion vector value associated with each pel of such every other vertically-neighboring pel pair, without actually calculating an average amount for any pel pair, but rather merely passing through alternating pel pairs, effectively to reduce computational activity. For example, in this case, particular motion vector values associated with pel pair 217 are selected for further calculation and transferred forward as pel pair 219, but vertically-neighboring pel pair 218 are disregarded and essentially thrown-out for purpose of pixel averaging.

More particularly, with respect to pixel-omitting algorithm, different types of picture with different search ranges adopt different methods of dropping and slipping. Accordingly, various motion estimation cases are summarized as follows:

Frame Picture:
  P-Type:
    Search range (±63, ±31):
      Vertical direction: (full search) (half sample)
      Horizontal direction: (half search) (one fourth sample)
    Search range (±31, ±15):
      Vertical direction: (full search) (full sample)
      Horizontal direction: (half search) (half sample)
    Search range (±15, ±15):
      Vertical direction: (full search) (full sample)
      Horizontal direction: (half search) (half sample)
    Search range (±7, ±7):
      Vertical direction: (full search) (full sample)
      Horizontal direction: (half search) (half sample)
  B-Type:
    Search range (±31, ±15):

Vertical direction: (full search) (half sample)
Horizontal direction: (half search) (half sample)
Search range (±15, ±15):
   Vertical direction: (full search) (full sample)
   Horizontal direction: (half search) (half sample)
Search range (±7, ±7):
   Vertical direction: (full search) (full sample)
   Horizontal direction: (half search) (half sample)
Field Picture:
  P-Type
  Search range (±63, ±15):
   Vertical direction: (half search) (half sample)
   Horizontal direction: (half search) (half sample)
  Search range (±31, ±7):
   Vertical direction: (full search) (full sample)
   Horizontal direction: (half search ) (half sample)
  Search range(±15, ±7):
   Vertical direction: (fill search ) (full sample)
   Horizontal direction: (half search) (half sample)
  Search range (±7, ±3):
   Vertical direction: (full search) (full sample)
   Horizontal direction: (half search) (half sample)
  B-Type:
  Search range (±31, ±7):
   Vertical direction: (full search) (half sample)
   Horizontal direction: (half search) (half sample)
  Search range (±15, ±7):
   Vertical direction: (full search) (full sample)
   Horizontal direction: (half search) (half sample)
  Search range (±7, ±3):
   Vertical direction: (full search) (full sample)
   Horizontal direction: (half search) (half sample)

"Full search" means search includes each position. "Full sample" means no decimation, and each pel is included. "Half search" in horizontal direction means searching pattern in horizontal direction skips one position for each search.

In accordance with the present invention, single-chip implementation of digital signal processing scheme for encoding compressed video signals, which are preferably compliant to and extendible compatibly from MPEG standard, achieves multi-stage, low-complexity motion estimation for interframe video coding. Dual-stage motion prediction scheme firstly pixel-averages decompressed bitstream and then applies SOAD or equivalent digital transfer function to select minimized motion vector signal. Such minimum value corresponds to "best" estimation attempt among array of video image blocks within given display screen.

Minimized value calculation aims to recognize with improved likelihood presence of video object or image movement or picture displacement in current sample of received bitstream relative to one or more reference pictures taken at earlier or later time slices. Such differential calculation is performed over one or more select search variable range or screen pixel portions (i.e., spatially or temporally) for preliminary rough motion determination. Then motion estimation is refined by reapplying SOAD or equivalent digital transfer function one or more times. Refined motion estimation may be performed iteratively on neighboring 16×16 blocks using full, half, quarter or smaller fraction of pel resolution across vertical and/or horizontal offsets further towards select minimum motion vector signal.

FIGS. 7A and 7B are simplified diagrams of 16×16 pel matrix macroblocks, showing respectively frame pictures and field pictures partitioned for motion estimation. For frame picture 101, as shown in FIG. 7A, each 16×16 macroblock is divided into two 16×8 blocks 102, 103 representing top and bottom fields, respectively composed of odd rows 107 in top portion 102, and even rows 108 in bottom portion 103. For field picture 104, as shown in 7B, each 16×16 macroblock is divided into two 16×8 blocks 109, 110 representing upper and lower halves 105, 106, respectively.

For each current macroblock, after motion estimation, at most six motion vectors may be generated based on differential calculation between current data and one or more reference data using SOAD or equivalent transfer function. Note in case of P-type current picture, only three motion vectors corresponding to forward estimation are generated, whereas for B-type current macroblock, six motion vectors are generated. Thus, for both frame and field pictures, depending on forward or backward estimation, motion vector calculation scheme is summarized as follows:

Frame Picture:
  Forward Estimation:
   Vector 1: frame estimation
   Vector 2: top-to-top or bottom-to-top estimations
   Vector 3: top-to-bottom or bottom-to-bottom estimations
  Backward Estimation:
   Vector 4: frame estimation
   Vector 5: top-to-top or bottom-to-top estimations
   Vector 6: top-to-bottom or bottom-to-bottom estimations
Field Picture:
  Forward Estimation:
   Vector 1: 16×16 estimation
   Vector 2: upper-to-top or lower-to-top estimations (16×8)
   Vector 3: upper-to-bottom or lower-to-bottom estimations (16×8)
  Backward Estimation:
   Vector 4: 16×16 estimation
   Vector 5: upper-to-upper or lower-to-upper estimations (16×8)
   Vector 6: upper-to-lower or lower-to-lower estimations (16×8)

In accordance with an important aspect of present invention, MRB 8 conducts second-stage refined motion estimation, particularly by processing motion vector signal selected by MEB 6 and applying thereto equivalent SOAD function to such macroblocks which correspond to motion vectors surrounding the selected motion vector. Each surrounding motion vector is offset horizontally or vertically by one, (or, as accomplished through iterative recalculations to refine and obtain improved minimum values, half, quarter, eighth, sixteenth, or other lesser fraction of) pel resolution as displaced spatially from selected motion vector.

Offset calculation is determined over certain search range including each surrounding block between current motion vector which corresponds to best-match prediction block and surrounding motion vectors corresponding to each surrounding block. This way, another more-refined SOAD signal is generated toward obtaining another minimum of such SOAD function, thereby associating best-match prediction block for generating motion vector signal that represents desired motion vector.

More particularly, with respect to MRB 8 operation, based on motion vectors obtained from MEB 6 coarse search scheme, motion vectors are refined into further pel accuracy by searching 16×16 blocks corresponding to nine motion displacements equal to MV+(−1, −1), MV+(−1, 0), MV+(−1, 1), MV+(0, −1), MV, MV+(0, 1), MV+(1, −1), MV+(1, 0), and MV+(1, 1). Displacement gives best match by using criterion of minimum absolute difference between current macroblock and prediction is selected as new refined motion vector MV0.

Newly refined MV is then served as basis for half-pixel motion vector search where nine absolute sums of differences between current MB and prediction displaced by (−0.5, −0.5), (−0.5, 0.0), (−0.5, 0.5), (0.0, −0.5), (0.0, 0.0), (0.0, 0.5), (0.5, −0.5), (0.5, 0.0), and (0.5, 0.5) are calculated. Displacement with minimum absolute sum is selected as optimum motion vector for mode selection at later or subsequent iterative stage.

Preferably, refinements are performed for Frame, Top Field, and Bottom Field motion search in Frame picture, and Field, Top 16×8 subfield, and Bottom 16×8 subfield motion search in Field picture. For P-pictures, forward search is used. For B-pictures, both forward and backward searches are used.

Figure 8:
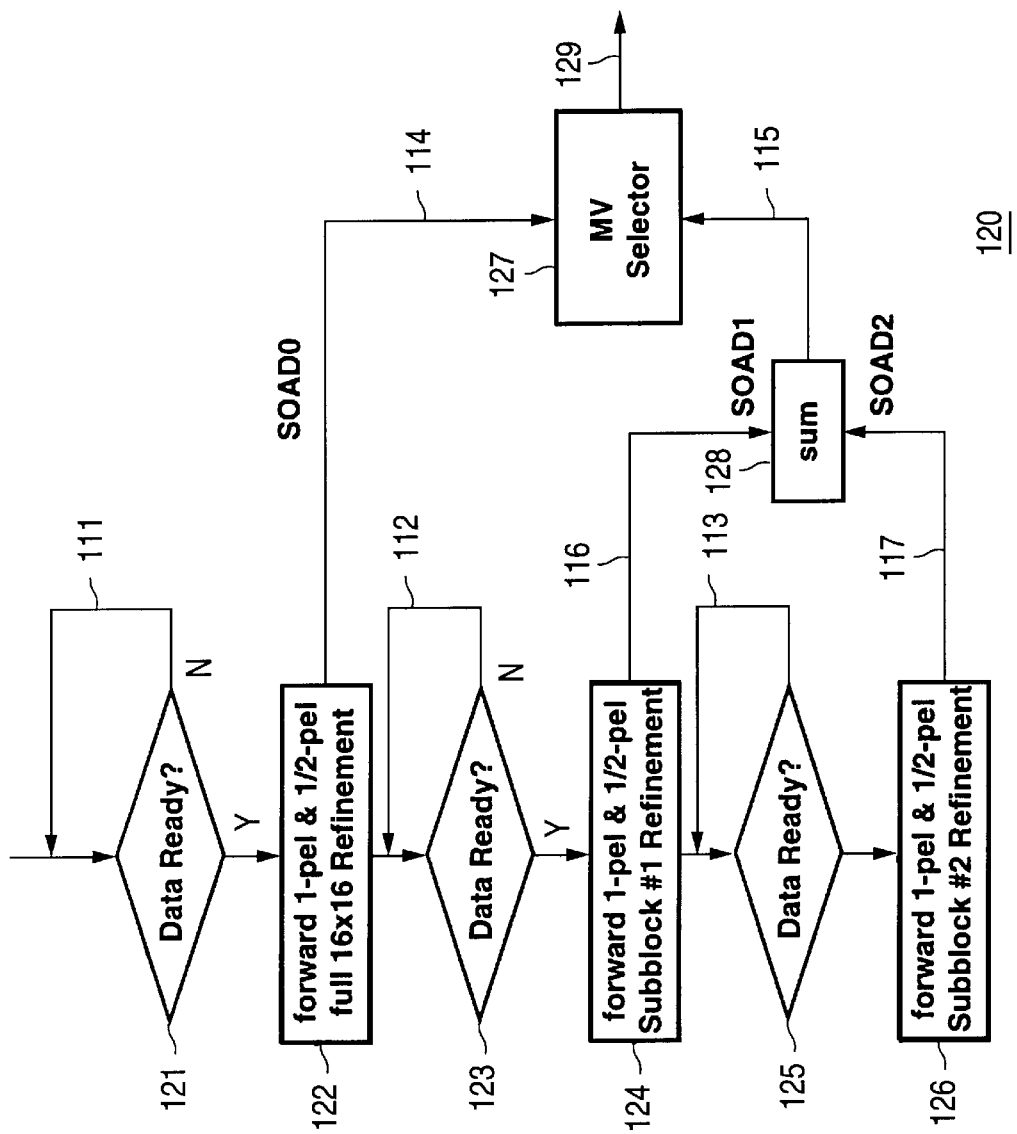
FIG. 8 is a flow chart showing P-picture motion refinement according to present invention.

FIG. 8 shows forward path flow chart for motion estimation with P-picture motion refinement technique 120 performed by MRB 8, starting with current macroblock signal along with corresponding reference data being received from SDRAM 2, and determined 121 whether ready, or if not, then wait cycle 111 until so ready with properly-fetched current macroblock and reference data.

MRB 8 then performs single-pel and half-pel forward motion estimation, under full 16×16 refinement 122 conditions, unlike previously where motion estimation was calculated over neighboring pixels. Note in this case, pixel averaging or omittance is not performed. Here, based on reference data being in front of current macro block, refined motion estimation signal SOAD0 114 is generated, preferably by determining entire vector set as described herein for full-pel calculation initially, then calculate for half-pel resolution.

Again, MRB 8 wait cycles 112 through data ready 123 until proper macroblock and reference data are available. When so read, MRB 8 performs single-pel and half-pel forward motion estimation under subblock #1 refinement 124. Here, based on top or upper portions reference data, refined motion estimation signal SOAD1 116 is generated similarly but for 16×8 blocks.

Next, MRB 8 wait cycles 113 through data ready 125 until proper macroblock and reference data are available. When so ready, MRB 8 performs single-pel and half-pel forward motion estimation under subblock #2 refinement 126. Here, based on bottom or lower portions reference data, refined motion estimation signal SOAD2 117 is generated similarly as above for 16×8 blocks.

As shown, SOAD1 116 and SOAD2 117 signals are received by summing unit 128 to generate summed signal 115. SOAD0 114 signal and summed signal 115 are received by motion vector (MV) selector 127 to select best, lowest comparative motion vector value 129 as refined motion estimation solution to be sent to MPU 24.

Figure 9:
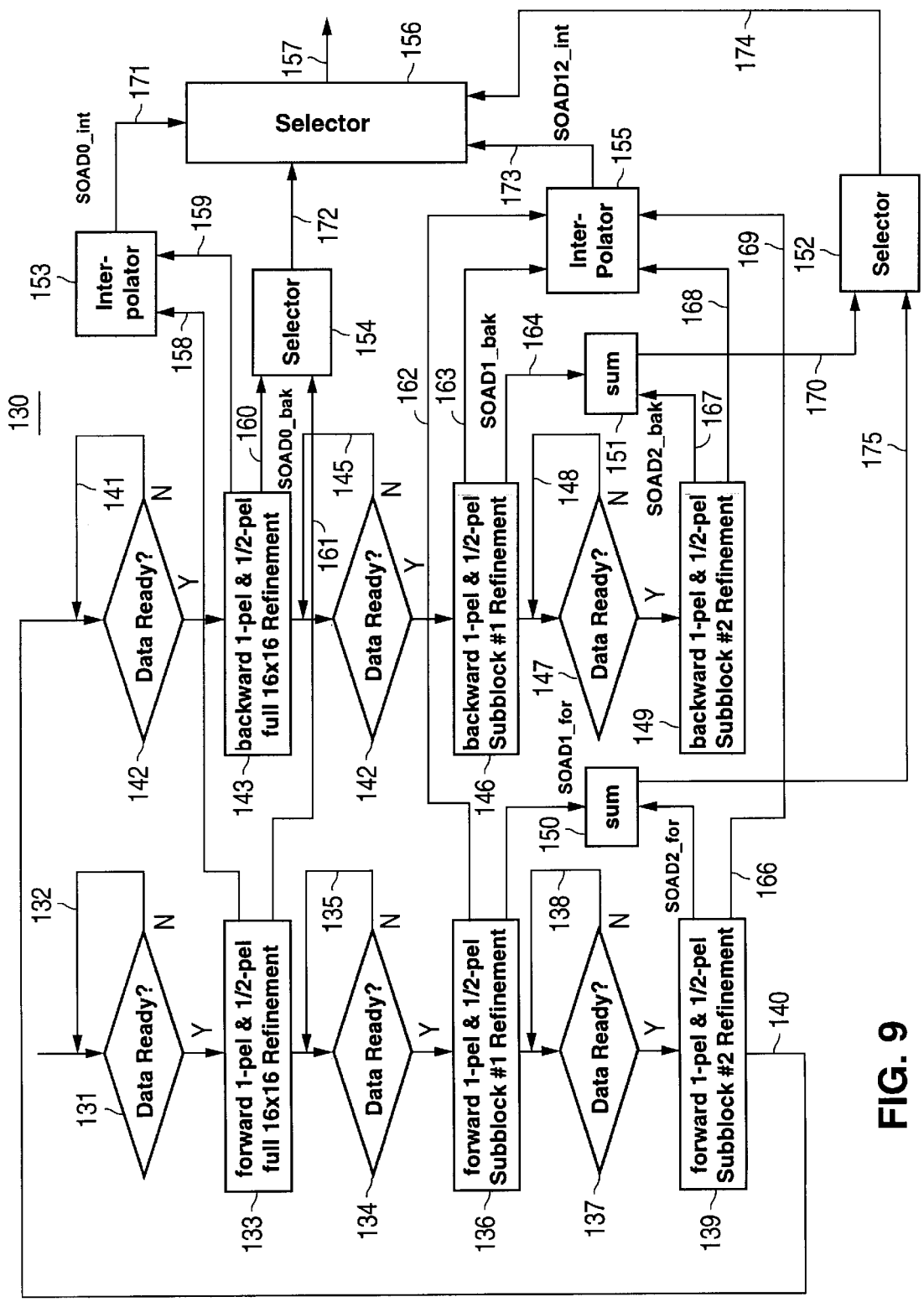
FIG. 9 is a flow chart showing B-picture motion refinement according to present invention.

FIG. 9 shows flow chart showing B-picture motion refinement, with forward, backward and interpolated motion estimation refinement technique 130, as performed by MRB 8. Initially, methodology starts with current macroblock signal along with corresponding reference data being received from SDRAM 2, and determined 131 whether ready, or if not, then wait cycle 132 until so ready with properly fetched current macroblock and reference data.

MRB 8 then performs single-pel and half-pel forward motion estimation, under full 16×16 refinement 122 conditions. Since reference data is placed in front of current macro block, forward motion estimation signals 158, 161 (SOAD0_) for are generated, preferably by determining entire vector set as described herein for full-pel calculation initially, then calculate for half-pel resolution.

MRB 8 wait cycles 135 again through data ready 134 until proper macroblock and reference data are available. When so ready, MRB 8 performs single-pel and half-pel forward motion estimation under subblock #1 refinement 136. Here, based on top or upper portions reference data, forward motion estimation signals 162, 165 (SOAD1_for) are generated similarly but for 16×8 blocks.

Next, MRB 8 wait cycles 138 through data ready 137 until proper macroblock and reference data are available. When so ready, MRB 8 performs single-pel and half-pel forward motion estimation under subblock #2 refinement 139. Here, based on bottom or lower portions reference data, refined motion estimation signals 169, 166 (SOAD2-for) are generated similarly as above for 16×8 blocks.

In the backward path, MRB 8 continues forward output signal 140 being received and determined 141 whether ready, or if not, then wait cycle 141 until so ready with properly fetched current macroblock and reference data.

MRB 8 performs single-pel and half-pel backward motion estimation, under full 16×16 refinement 143 conditions. Since reference data is placed behind current macro block, backward motion estimation signals 159, 160 (SOAD0_bak) are generated, preferably by determining entire vector set as described herein for full-pel calculation initially, then calculate for half-pel resolution.

MRB 8 wait cycles 145 again through data ready 144 until proper macroblock and reference data are available. When so ready, MRB 8 performs single-pel and half-pel backward motion estimation under subblock #1 refinement 146. Here, based on top or upper portions reference data, backward motion estimation signals 163, 164 (SOAD1_bak) are generated similarly but for 16×8 blocks.

Next, MRB 8 wait cycles 148 through data ready 147 until proper macroblock and reference data are available. When so ready, MRB 8 performs single-pel and half-pel backward motion estimation under subblock #2 refinement 149. Here, based on bottom or lower portions reference data, refined motion estimation signals 168, 167 (SOAD2-bak) are generated similarly as above for 16×8 blocks.

As shown, first interpolator or averaging module 153 receives forward signal 158 and reverse signal 159 to generate first interpolated signal 171 (SOAD0_int). Also, second interpolator or average module 155 receives forward signal 162, forward signal 169, backward signal 163, and backward signal 168 to generate second interpolated signal 173 (SOAD12_int).

Moreover, forward summing module 150 receives forward signal 165 and forward signal 166 (SOAD2_for), and generates forward sum signal 175. Further, backward summing module 151 receives backward signal 164 (SOAD1_bak) and backward signal 167 (SOAD2_bak), and generates backward sum signal 170.

Also, first selector module 154 receives backward signal 160 (SOAD0_bak) and forward signal 161 (SOAD0_for) to generate first selected signal 172. Additionally, second selector module 152 receives backward signal 170 and forward signal 175 to generate second selected signal 174. Furthermore, third selector module 156 receives first interpolated signal 171 (SOAD_int), first selected signal 172, second interpolated signal 173 (SOAD12_int), and second selected signal 174 to generate therefrom third selected signal 157. Preferably, such signal 157 is received by selector 156 to select best, lowest comparative motion vector value 157 as refined motion estimation solution to be sent to MPU 24.

Figure 10:
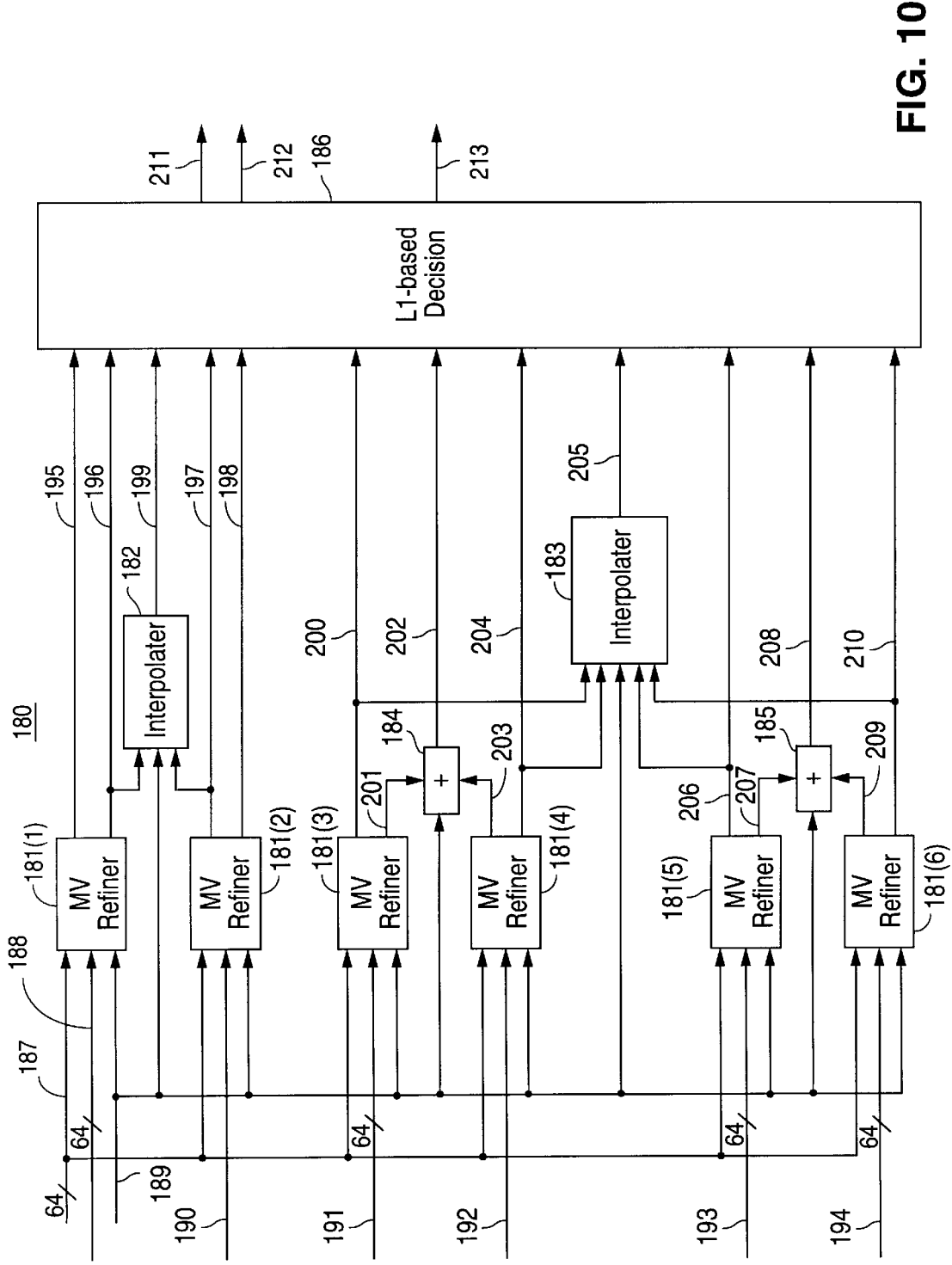
FIG. 10 is a block diagram of motion refiner 180 for implementing present invention.

FIG. 10 is preferred block diagram 180 for implementing MRB 8. Current block input signal 187 and type signal 189 are received in parallel by motion vector (MV) refiners 181(1–6). But each MV refiner 181(1–6) receives different reference signal.

MV refiner 181(1) receives F_for_ref reference signal 188, and generates first refined output signals 195 (F_for_MAE), 196 (F_for_mv); MV refiner 181(2) receives F_bak_ref reference signal 190, and generates second refined output signals 197 (F_bak_mv), 198 (F_bak_MAE); MV refiner 181(3) receives f1_for_ref reference signal 191, and generates third refined output signals 200 (f1_for_mv &_fs), 201 (f1_for_MAE); MV refiner 181(4) receives f2_for_ref reference signal 192, and generates fourth refined output signals 203 (f2_for_MAE), 204 (f2_for_mv &_fs); MV refiner 181(5) receives f1_bak_ref reference signal 193, and generates fifth refined output signals 206 (f1_bak_mv &_fs), 207 (f1_bak_MAE); and MV refiner 181(6) receives f2_bak_ref reference signal 194, and generates sixth refined output signals 209 (f2_bak_MAE), 210 (f2_bak_mv &_fs).

Further, first interpolator or averaging module 182 receives F_for_mv signal 196, type signal (pict_cod_type) 189, F_bak_mv signal 197, and generates first interpolator signal 199 (F_int_MAE). Also, second interpolator or averaging module 183 receives f1_for_mv &_fs signal 200, f2_for_mv &_fs signal 204, pict_cod_type signal 189, f1_bak_mv &_fs signal 206, and f2_bak_mv &_fs signal 210, and generates second interpolator signal 205 (f_int_MAE).

Finally, as shown, L-1 based decision module 186 receives F_for_MAE signal 195, F_for_mv signal 196, F_int_MAE signal 199, F_bak_mv signal 197, F_bak_MAE signal 198, f1_for_mv &_fs signal 200, f_for_MAE signal 202, f2_for_mv &_fs signal 204, f_int_MAE signal 205, f1_bak_mv &_fs signal 206, f_bak_MAE signal 208, and f2_bak_mv &_fs signal 210; and such module 186 generates mb_type signal 211, motion_type signal 212, and MV for min MAE signal 213.

Note that for P-pictures, MRB 8 performs three motion vector refinements, where motion vectors for Frame, Top Field, and Bottom field in a Frame picture (or Field, Upper 16×8, and Lower 16×8 in a Field picture) are refined into half-pel precision by finding minimum absolute error (MAE). Three sets of refined motion vectors and corresponding MAEs are obtained. Motion vectors are: F_for_mv, f1_for_mv, and f2_for_mv. Corresponding MAEs are denoted as: F_for_MAE and f_for_MAE.

For B-pictures, additional three motion vector refinements are necessary for backward motion searches. Three refined MVs F_bak_mv, f1_bak_mv, and f2_bak_mv and two corresponding MAEs F_bak_MAE and f_bak_MAE are obtained. Since B-pictures require bi-directional motion compensation, MAEs representing difference between current macroblock and interpolated prediction based on motion vectors are calculated. These are denoted as F_int_MAE and f_int_MAE.

What is claimed is:

1. In a digital signal processor circuit or software for encoding compressed digital video information, a method for motion estimation comprising the steps of:

receiving a digital video signal comprising a current picture and a first reference picture as reconstructed from an encoding process, each picture being partitioned into top and bottom or upper and lower portions for hybrid field and frame motion estimation and comprising a plurality of blocks, each block comprising a plurality of pels; and first processing for an initial rough determination in a multi-stage motion estimation by a signal processing circuit or software the received digital video signal by applying a first sum of absolute difference (SOAD) function to each block over a first search range between a first current motion vector corresponding to the current picture and a first reference motion vector corresponding to the first reference picture to generate a first SOAD signal, and determining a first minimum over the first search range of the generated first SOAD signal associated with a first selected best-match prediction block to generate a first selected motion vector signal representing a first selected motion vector.

2. The method of claim 1 further comprising the step of:

second processing for a refined determination by the signal processing circuit or software the generated first selected motion vector signal by applying a second SOAD function to a plurality of blocks that correspond to a plurality of motion vectors surrounding the first selected motion vector, each surrounding motion vector being offset horizontally or vertically by one pel from the first selected motion vector, over a second search range including each surrounding block between a second current motion vector corresponding to the first selected best-match prediction block and a plurality of second surrounding motion vectors corresponding to each surrounding block to generate a second SOAD signal, and determining a second minimum of the second generated SOAD signal associated with a second selected best-match prediction block to generate a second selected motion vector signal representing a second selected motion vector.

3. The method of claim 2 further comprising the step of:

third processing for a more refined determination by the signal processing circuit or software the generated second selected motion vector signal by applying a third SOAD function to a plurality of blocks that correspond to a plurality of motion vectors surrounding the second selected motion vector, each surrounding motion vector being offset horizontally or vertically by a half pel from the second selected motion vector, over a third search range including each such surrounding block offset by a half pel between a third current motion vector corresponding to the second selected best-match prediction block and a plurality of third surrounding motion vectors corresponding to each such surrounding block offset by a half pel to generate a third SOAD signal, and determining a third minimum over the third search range of the third generated SOAD signal associated with a third selected best-match prediction block to generate a third selected motion vector signal representing a third selected motion vectors such third selected motion vector representing an iteratively calculated third-stage refinement for multiple-stage motion estimation.

4. The method of claim 2 wherein the received digital video signal further comprises a second reference picture, the first processing step for an other initial rough determination by the signal processing circuit or software applying the first SOAD function to each block over an other search range between the first current motion vector and a second reference motion vector corresponding to the second reference picture to generate an other first SOAD signal, determining an other first minimum over the other first search range of the generated other first SOAD signal associated with an other first selected block to generate an other first selected motion vector signal, and determining an average value of the first selected motion vector signal and the other first selected motion vector signal to generate an average first selected motion vector signal associated with an averaged selected motion vector, and the second processing step for an other refined determination by the signal processing circuit or software applying a second SOAD function to a plurality of blocks that correspond to a plurality of motion vectors surrounding the averaged selected motion vector, each surrounding motion vector being offset horizontally or vertically by one pel from the averaged selected motion vector, over a second search range including each such surrounding motion vector between a second current motion vector corresponding to the averaged selected block and a plurality of second surrounding motion vectors corresponding to each such surrounding block to generate a second SOAD signal, and determining a second minimum over the second search range of the second generated SOAD signal associated with a second selected block to generate a second selected motion vector signal.

5. The method of claim 1 wherein the digital signal processor comprises a plurality of memory units, wherein the received digital video signal is stored and accessed in interleaved manner in the memory units.

6. The method of claim 1 further comprising the step of:

before the first processing step, applying a pixel-averaging or omitting function to the received digital video signal to generate a first averaged digital video signal.

7. The method of claim 6 wherein the first averaged digital video signal is generated by determining an average for each horizontally-neighboring pel pair of a motion vector value associated with each horizontally-neighboring pel pair.

8. The method of claim 6 wherein the first averaged digital video signal is generated by determining an average for every other horizontally-neighboring pel pair of a motion vector value associated with such every other horizontally-neighboring pel pair.

9. The method of claim 6 wherein the first averaged digital video signal is generated by determining for each pel of every other vertically-neighboring pel pair a motion vector value associated with each pel of such every other vertically-neighboring pel pair, whereby a plurality of alternating vertically-neighboring pel pairs are effectively omitted from the determination of the motion vector value, such that no pixel average value is calculated therefrom.

10. The method of claim 9 further comprising the step of:

fourth processing for a more refined determination by the signal processing circuit or software the generated third selected motion vector signal by applying a fourth SOAD function to a plurality of blocks that correspond to a plurality of motion vectors surrounding the third selected motion vector, each surrounding motion vector being offset horizontally or vertically by a quarter pel from the third selected motion vector, over a fourth search range including each such surrounding block offset by a quarter pel between a fourth current motion vector corresponding to the third selected best-match prediction block and a plurality of fourth surrounding motion vectors corresponding to each such surrounding block offset by a quarter pel to generate a fourth SOAD signal, and determining a fourth minimum over the fourth search range of the fourth generated SOAD signal associated with a fourth selected best-match prediction block to generate a fourth selected motion vector signal representing a fourth selected motion vector, such fourth selected motion vector representing an iteratively calculated fourth-stage refinement for multiple-stage motion estimation.

11. The method of claim 1 wherein each picture further comprises a frame picture, each macroblock being partitioned into a top field and a bottom field.

12. The method of claim 1 wherein each picture further comprises a field picture, each macroblock being partitioned into an upper portion and a lower portion.

13. A digital signal processor circuit or software for encoding compressed digital video information:

means for receiving a digital video signal comprising a current picture and a first reference picture as reconstructed from an encoding process, each picture being partitioned into top and bottom or upper and lower portions for hybrid field and frame motion estimation and comprising a plurality of blocks, each block comprising a plurality of pels; and motion estimator for processing for an initial rough determination the received digital video signal by applying a first sum of absolute difference (SOAD) function to each macroblock over a first search range between a first current motion vector corresponding to the current picture and a first reference motion vector corresponding to the first reference picture to generate a first SOAD signal, and determining a first minimum over the first search range of the generated first SOAD signal associated with a first selected best-match prediction block to generate a first selected motion vector signal representing a first selected motion vector.

14. The processor of claim 13 further comprising:

motion refiner for processing for a refined determination the generated first selected motion vector signal by applying a second SOAD function to a plurality of blocks that correspond to a plurality of motion vectors surrounding the first selected motion vector, each surrounding motion vector being offset horizontally or vertically by one pel or sub-pel from the first selected motion vector, over a second search range including each surrounding block between a second current motion vector corresponding to the first selected best-match prediction block and a plurality of second surrounding motion vectors corresponding to each surrounding block to generate a second SOAD signal, and determining a second minimum over the second search range of the second generated SOAD signal associated with a second selected best-match prediction block to generate a second selected motion vector signal representing a second selected motion vector, such second selected motion vector representing an iteratively calculated second-stage refinement for multiple-stage motion estimation.

15. In an MPEG-2 video encoder circuit or software for processing a digital bitstream, a process for dual-stage motion prediction comprising the steps of:

for an initial rough determinations applying a sum of absolute difference (SOAD) function to a digital bitstream comprising at least one picture partitioned into top and bottom or upper and lower portions for hybrid field and frame motion estimation, thereby generating a first minimum motion vector; and for a refined determination, applying a second SOAD function to a plurality of motion vectors surrounding the first minimum motion vector by a full or sub-pell offset, thereby generating a second minimum motion vector, such second minimum motion vector representing an iteratively calculated second-stage refinement for multiple-stage motion estimation.

16. The process of claim 15 further comprising the step of:

applying a pixel-averaging or omitting function to the digital bitstream.

17. The process of claim 15 wherein:

the digital bitstream is sourced in an interleaved manner from a dynamic random access memory (DRAM) that is embedded in the encoder circuit.

18. The process of claim 15 wherein:

the digital bitstream is sourced from an complementary metal oxide semiconductor (CMOS) imager that is integrated in the encoder circuit.

19. The process of claim 15 wherein:

both applying steps are selectively switched dynamically according to one or more specified thresholds for conducting motion prediction.

20. The process of claim 15 further comprising the step of:

for a more refined determination applying a third SOAD function to a plurality of motion vectors surrounding the second minimum motion vector by a half-pell offset thereby generating a third minimum motion vector such third minimum motion vector representing an iteratively calculated third-stage refinement for multiple-stage motion estimation.

21. An integrated MPEG-2 video encoder circuit or software for processing a digital bitstream for dual-stage motion prediction comprising:

a first coarse-determination stage for applying a sum of absolute difference (SOAD) function to a video signal representing at least one picture partitioned into top and bottom or upper and lower portions for hybrid field and frame motion estimation, and generating therefrom a first minimum motion vector; and a second refined-determination stage for applying a second SOAD function to a plurality of motion vectors neighboring the first minimum motion vector by a full or sub-pell offset and generating therefrom a second minimum motion vector, such second minimum motion vector representing an iteratively calculated second-stage refinement for multiple-stage motion estimation.

22. The circuit of claim 21 further comprising:

means for applying a pixel-averaging or omitting function to the video signal.

23. The circuit of claim 21 wherein:

the video signal is stored in an interleaved manner in a dynamic random access memory (DRAM) integrated in the circuit.

24. The circuit of claim 21 wherein:

the video signal is generated from a complementary metal oxide semiconductor (CMOS) imager embedded in the circuit.

25. The circuit of claim 21 wherein:

first and second stages are selectively switched dynamically according to one or more specified thresholds for conducting motion prediction.

26. The circuit of claim 21 wherein:

for a more refined determination the second stage applies a third SOAD function to a plurality of motion vectors surrounding the second minimum motion vector by a half-pell offset and generates therefrom a third minimum motion vector, such third minimum motion vector representing an iteratively calculated third-stage refinement for multiple-stage motion estimation.

* * * * *